(12) United States Patent
Paolini, Jr. et al.

(10) Patent No.: US 8,797,634 B2
(45) Date of Patent: Aug. 5, 2014

(54) MULTI-COLOR ELECTROPHORETIC DISPLAYS

(75) Inventors: Richard J. Paolini, Jr., Framingham, MA (US); George G. Harris, Woburn, MA (US); Stephen J. Telfer, Arlington, MA (US)

(73) Assignee: E Ink Corporation, Billerica, MA (US)

( * ) Notice: Subject to any disclaimer, the term of this patent is extended or adjusted under 35 U.S.C. 154(b) by 38 days.

(21) Appl. No.: 13/300,040

(22) Filed: Nov. 18, 2011

(65) Prior Publication Data

US 2012/0134009 A1 May 31, 2012

Related U.S. Application Data

(60) Provisional application No. 61/417,965, filed on Nov. 30, 2010.

(51) Int. Cl.
*G02B 26/00* (2006.01)
*G09G 3/34* (2006.01)

(52) U.S. Cl.
USPC ............................................ 359/296; 345/107

(58) Field of Classification Search
USPC ................................... 359/290–296; 345/107
See application file for complete search history.

(56) References Cited

U.S. PATENT DOCUMENTS

| 4,418,346 A | 11/1983 | Batchelder |
| 5,872,552 A | 2/1999 | Gordon, II et al. |
| 6,017,584 A | 1/2000 | Albert et al. |
| 6,120,839 A | 9/2000 | Comiskey et al. |
| 6,130,774 A | 10/2000 | Albert et al. |
| 6,144,361 A | 11/2000 | Gordon, II et al. |
| 6,172,798 B1 | 1/2001 | Albert et al. |
| 6,184,856 B1 | 2/2001 | Gordon, II et al. |
| 6,225,971 B1 | 5/2001 | Gordon, II et al. |
| 6,271,823 B1 | 8/2001 | Gordon, II et al. |
| 6,664,944 B1 | 12/2003 | Albert et al. |
| 6,672,921 B1 | 1/2004 | Liang et al. |
| 6,727,873 B2 | 4/2004 | Gordon, II et al. |
| 6,788,449 B2 | 9/2004 | Liang et al. |
| 6,864,874 B1 | 3/2005 | Ozawa |

(Continued)

FOREIGN PATENT DOCUMENTS

JP 2009-222759 10/2009

OTHER PUBLICATIONS

Kitamura, T., et al., "Electrical toner movement for electronic paper-like display", Asia Display/IDW '01, p. 1517, Paper HCS1-1 (2001), Nov. 26, 2013.

(Continued)

*Primary Examiner* — Mohammed Hasan
(74) *Attorney, Agent, or Firm* — David J. Cole

(57) ABSTRACT

An electrophoretic display (100) has stacked first (104) and second (120) electrophoretic layers, each comprising charged particles (W, C, Y, M) in a fluid (106, 122). The first layer contains particles of white (W) and first color (M) particles and has three optical states (a) white particles adjacent a viewing surface; (b) first color particles lie adjacent the viewing surface; and (c) both types of particles shuttered to allow light to pass through the first layer. The second layer contains particles having second (C) and third (Y) colors and has three optical states (d) second particles (C) adjacent the first layer; (e) third particles (Y) adjacent the first layer; and (f) second (C) and third (Y) particles intermixed within the fluid.

17 Claims, 16 Drawing Sheets

(56) References Cited

U.S. PATENT DOCUMENTS

| | | |
|---|---|---|
| 6,864,875 B2 | 3/2005 | Drzaic et al. |
| 6,866,760 B2 | 3/2005 | Paolini, Jr. et al. |
| 6,922,276 B2 | 7/2005 | Zhang et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,075,502 B1 | 7/2006 | Drzaic et al. |
| 7,116,318 B2 | 10/2006 | Amundson et al. |
| 7,167,155 B1 | 1/2007 | Albert et al. |
| 7,170,670 B2 | 1/2007 | Webber |
| 7,236,291 B2 | 6/2007 | Kaga et al. |
| 7,312,784 B2 | 12/2007 | Baucom et al. |
| 7,321,459 B2 | 1/2008 | Masuda et al. |
| 7,339,715 B2 | 3/2008 | Webber et al. |
| 7,369,299 B2 | 5/2008 | Sakurai et al. |
| 7,411,719 B2 | 8/2008 | Paolini, Jr. et al. |
| 7,453,445 B2 | 11/2008 | Amundson |
| 7,535,624 B2 | 5/2009 | Amundson et al. |
| 7,667,684 B2 | 2/2010 | Jacobson et al. |
| 7,675,502 B2 | 3/2010 | Chopra et al. |
| 7,679,814 B2 | 3/2010 | Paolini et al. |
| 7,705,823 B2 | 4/2010 | Nihei et al. |
| 7,746,544 B2 | 6/2010 | Comiskey et al. |
| 7,791,789 B2 | 9/2010 | Albert et al. |
| 7,839,564 B2 | 11/2010 | Whitesides et al. |
| 7,907,327 B2 | 3/2011 | Jang et al. |
| 7,910,175 B2 | 3/2011 | Webber et al. |
| 7,952,790 B2 | 5/2011 | Honeyman et al. |
| 7,956,841 B2 | 6/2011 | Albert et al. |
| 7,999,787 B2 | 8/2011 | Amundson et al. |
| 8,009,348 B2 | 8/2011 | Zehner et al. |
| 8,054,526 B2 | 11/2011 | Bouchard |
| 8,098,418 B2 | 1/2012 | Paolini et al. |
| 8,466,852 B2 | 6/2013 | Drzaic et al. |
| 2005/0259068 A1 | 11/2005 | Nihei et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2008/0043318 A1 | 2/2008 | Whitesides et al. |
| 2008/0048970 A1 | 2/2008 | Drzaic et al. |
| 2009/0004442 A1 | 1/2009 | Danner |
| 2009/0225398 A1 | 9/2009 | Duthaler et al. |
| 2009/0273827 A1* | 11/2009 | Lin et al. .................. 359/296 |
| 2010/0103502 A1 | 4/2010 | Jacobson et al. |
| 2010/0156780 A1 | 6/2010 | Jacobson et al. |
| 2011/0292094 A1* | 12/2011 | Lin .............................. 345/690 |
| 2012/0307346 A1* | 12/2012 | Sprague .................. 359/296 |

OTHER PUBLICATIONS

Yamaguchi, Y., et al., "Toner display using insulative particles charged triboelectrically", Asia Display/IDW '01, p. 1729, Paper AMD4-4 (2001), Dec. 4, 2007.

\* cited by examiner

MULTI-COLOR ELECTROPHORETIC DISPLAYS

REFERENCE TO RELATED APPLICATION

This application claims benefit of provisional Application Ser. No. 61/417,965, filed Nov. 30, 2011; the entire contents of this earlier application is herein incorporated by reference.

BACKGROUND OF INVENTION

The present invention relates to multi-color electrophoretic media and to displays incorporating such media.

Particle-based electrophoretic displays, in which a plurality of charged particles move through a fluid under the influence of an electric field, have been the subject of intense research and development for a number of years. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication Nos. 2005/0259068, 2006/0087479, 2006/0087489, 2006/0087718, 2006/0209008, 2006/0214906, 2006/0231401, 2006/0238488, 2006/0263927 and U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. 7,116,318 and 7,535,624;

(e) Color formation and color adjustment; see for example U.S. Pat. Nos. 6,017,584; 6,664,944; 6,864,875; 7,075,502; 7,167,155; 7,667,684; and 7,791,789; and U.S. Patent Applications Publication Nos. 2004/0263947; 2007/0109219; 2007/0223079; 2008/0023332; 2008/0043318; 2008/0048970; 2008/0211764; 2009/0004442; 2009/0225398; 2009/0237776; 2010/0103502; 2010/0156780; and 2010/0225995;

(f) Methods for driving displays; see for example U.S. Pat. Nos. 7,012,600 and 7,453,445; and (g) Applications of displays; see for example U.S. Pat. No. 7,312,784; and U.S. Patent Application Publication No. 2006/0279527.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Electrophoretic media operating in shutter mode may be useful in multi-layer structures for full color displays; in such structures, at least one layer adjacent the viewing surface of the display operates in shutter mode to expose or conceal a second layer more distant from the viewing surface.

As already indicated, an encapsulated or microcell electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339, 715); and other similar techniques.) Thus, the resulting display can be flexible. Further, because the display medium can be printed (using a variety of methods), the display itself can be made inexpensively.

Most prior art electrophoretic media essentially display only two colors. Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid (in which case, the first color is displayed when the first type of particles lie adjacent the viewing surface of the display and the second color is displayed when the second type of particles lie adjacent the viewing surface). Typically the two colors are black and white. If a full color display is desired, a color filter array may be disposed over the viewing surface of the monochrome (black and white) display. Such a color filter array is typically of the red/green/blue ("RGB") or red/green/blue/white ("RGBW") type. Displays with color filters rely upon an area sharing approach with three (in the case of RGB displays) or four (in the case of RGBW displays) sub-pixels together functioning as a single full color pixel. Unfortunately, each color can only be displayed by part of the display area. For example, in an RGBW display, each of red, green and blue can only be displayed by ¼ of the display area (one sub-pixel out of four) and white can effectively be displayed by ½ of the display area (one complete sub-pixel out of four, plus each colored sub-pixel acts as ⅓ white, so the three colored sub-pixels together provide another one complete white sub-pixel). This area sharing approach result in colors less bright than is desirable.

Alternatively full color displays can be constructed using multiple color-changing layers operating in shutter mode. See, for example, U.S. Pat. No. 6,727,873, which describes a full color electrophoretic display using three separate stacked layers each containing electrophoretic particles absorbing part of the visible spectrum. Apart from being complicated and potentially expensive, such a multi-layer display requires precise alignment of the various layers, and highly light transmissive electrodes (and transistors, in the case of an active matrix display) since each layer causes some optical losses due to absorption or reflection by the electrodes, and especially the transistors in an active matrix display. Multi-layer displays can also suffer from parallax problems as the thickness of the display stack approaches or exceeds the pixel size.

There is still, however, a need for electrophoretic media capable of displaying more colors at each pixel in order that, for example, such media can reproduce the appearance of high quality color printing. Such high quality printing is typically effected using at least four inks, cyan/magenta/yellow/black ("CMYK"). It is often not appreciated that a so-called "four-color" CMYK printing system is in reality a five-color system, the fifth color being the white background provided by the paper (or similar) surface when no ink is applied thereto. Since there is no comparable background color in an essentially opaque electrophoretic medium unless it is being used in shutter mode, a non-shutter mode electrophoretic medium should be capable of displaying five colors (black, white and three primary colors, the three primary colors typically being cyan, magenta and yellow, or red, green and blue).

The present invention provides a full color display capable of displaying all colors at every portion of the active area of the display while using only two electrophoretic layers. The present invention also provides an electrode structure, and a method of driving an electrophoretic display, which simplifies the backplane of such a full color display. The electrode structure and driving method of the present invention may also be useful in other types of display.

SUMMARY OF INVENTION

In one aspect, this invention provides an electrophoretic display having a viewing surface and comprising a first electrophoretic layer adjacent the viewing surface and a second electrophoretic layer on the opposed side of the first electrophoretic layer from the viewing surface, the first electrophoretic layer comprising a first fluid, a plurality of charged white particles and a plurality of light transmissive charged particles of a first color different from white, the white and first color particles being dispersed in the first fluid, the first electrophoretic layer being provided with driving means capable of driving the white and first color particles to three different optical states, namely (a) a first optical state in which the white particles lie adjacent the viewing surface and the first color particles are spaced from the viewing surface; (b) a second optical state in which the first color particles lie adjacent the viewing surface and the white particles are spaced from the viewing surface; and (c) a third optical state in which the white and first color particles occupy only a minor proportion of the area of the first electrophoretic layer, thereby permitting light entering the first electrophoretic layer through the viewing surface to pass through the first electrophoretic layer to the second electrophoretic layer; and the second electrophoretic layer comprising a second fluid, a plurality of charged particles of a second color different from white and the first color, and a plurality of charged particles of a third color different from white and the first and second colors, the second and third color particles being dispersed in the second fluid, the second electrophoretic layer being provided with driving means capable of driving the second and third color particles to three different optical states, namely (d) a fourth optical state in which the second particles lie adjacent the first electrophoretic layer and the third color particles are spaced from this layer; (e) a fifth optical state in which the third particles lie adjacent the first electrophoretic layer and the second color particles are spaced from this layer; and (f) a sixth optical state in which the second and third color particles are intermixed within the second fluid.

In one form of such a "dual layer" electrophoretic display of the present invention, the second and third color particles are reflective. The first, second and third colors may be cyan, magenta and yellow (in any order). Since reflective cyan and yellow pigments with excellent color saturation are readily available, the second and third colors may be cyan and yellow, with the first color being magenta.

In principle, the first and second electrophoretic layers of the display of the present invention may be unencapsulated. However, for reasons given above, and because AC driving (if used—see below) and shutter mode driving are more effective with encapsulated displays, it is generally preferred that the first and second electrophoretic layers in the dual layer electrophoretic display of the present invention be encapsulated, that is to say that the particles and the fluid be confined within a plurality of capsules or microcells, or present as a plurality of discrete droplets surrounded by a continuous phase comprising a polymeric material, so that the display is a polymer-dispersed electrophoretic display as previously discussed.

The white and first color particles may be driven to their third (shutter mode) optical state by application of alternating electric fields ("AC driving"), with the first electrophoretic layer being provided with appropriate electrodes and drivers to enable such alternating electric fields to be applied. Particle movements resulting from AC driving have hitherto typically been regarded as due to dielectrophoresis, as described for example, in U.S. Pat. No. 7,999,787. However, in practice it is not easy to determine whether particle movements resulting from AC driving should be attributed to dielectrophoresis or to electro-osmotic forces (see for example U.S. Pat. Nos. 6,120,839 and 7,746,544), and accordingly AC driving will be discussed below without any attempt to delineate the exact physical phenomena responsible for the relevant particle movements. AC driving has the advantage of requiring only the two electrodes normally provided, one on each side of the electrophoretic medium, and thus can be achieved with a conventional backplane. However, AC driving may require the use of high frequency waveforms, often up to about 1 kHz, and such high frequency waveforms may be difficult to implement in active matrix displays. Accordingly, it is generally preferred that the shutter mode optical state be provided by confining the white and first color particles to electrodes which occupy only a minor fraction of the area of each pixel of the first electrophoretic layer, thus leaving light entering the first electrophoretic layer from the viewing surface free to pass through a major fraction of the pixel and reach the second electrophoretic layer; such electrodes which occupy only a minor fraction of the pixel are conventionally designated "side" or "auxiliary" electrodes. Despite the use of the term "side electrodes", it is not essential that these electrodes lie at the periphery of each pixel; for example, each auxiliary electrode could be in the form of a ring or partial ring around the periphery of the pixel or in the form of one or more small electrodes lying within the pixel.

In another aspect, this invention provides a novel way of interconnecting the side or auxiliary electrodes of a electrophoretic display wherein each sub-pixel has a main and at least one auxiliary electrode on one side of an electrophoretic medium and a third electrode on the opposed side of the electrophoretic medium. (The term "pixel" is used herein to denote the smallest unit of the display capable of displaying all the colors which the display is capable of showing. The term "sub-pixel" is used herein to denote the smallest unit of the display capable of changing color. It will be appreciated that in displays, such as the dual layer display of the present invention in which all parts of the display are capable of displaying all colors, the sub-pixel and pixel are identical.) The electrophoretic display comprises a fluid and at least one type of charged particles dispersed in the fluid. (Such an electrophoretic display may or may not be a dual layer electrophoretic display of the present invention.) In this electrophoretic display, the auxiliary electrodes of a plurality of sub-pixels are connected to a common drive line. Such a display may be driven by first driving all the charged particles in the plurality of pixels adjacent the auxiliary electrodes, and then driving at least one of the plurality of sub-pixels to an optical state in which at least some of the charged particles do not lie adjacent the auxiliary electrodes.

In such an "interconnected auxiliary electrodes" or "IAE" display, conveniently the auxiliary electrodes of all the sub-pixels in the display are connected to the common drive line. The third electrode of each sub-pixel may be in the conventional form of a single common front electrode extending across the entire display. There are two principal variants of the IAE. If all of the charged particles bear charges of the same polarity (either because the display uses only a single type of charged particle, typically in a colored fluid, or because the display uses two or more types of charged particle bearing charges of the same polarity but having different electrophoretic mobilities), only a single auxiliary electrode is needed for each sub-pixel, and such a display may hereinafter be called a "single interconnected auxiliary electrode" or "SIAE" display. If, however, any sub-pixel comprises particles bearing charges of both polarities, two auxiliary electrodes are needed for that sub-pixel, so that potentials of opposite polarity (relative to the potential of the third electrode) can be applied to the two auxiliary electrodes to draw the particles bearing charges of both polarities to the two auxiliary electrodes, thus rendering the major part of the area of the sub-pixel clear. Such a display may conveniently be denominated a "double interconnected auxiliary electrode" display of the present invention.

BRIEF DESCRIPTION OF THE DRAWINGS

FIG. 1A shows the pixel in its white optical state.

DETAILED DESCRIPTION

Figure 1A:
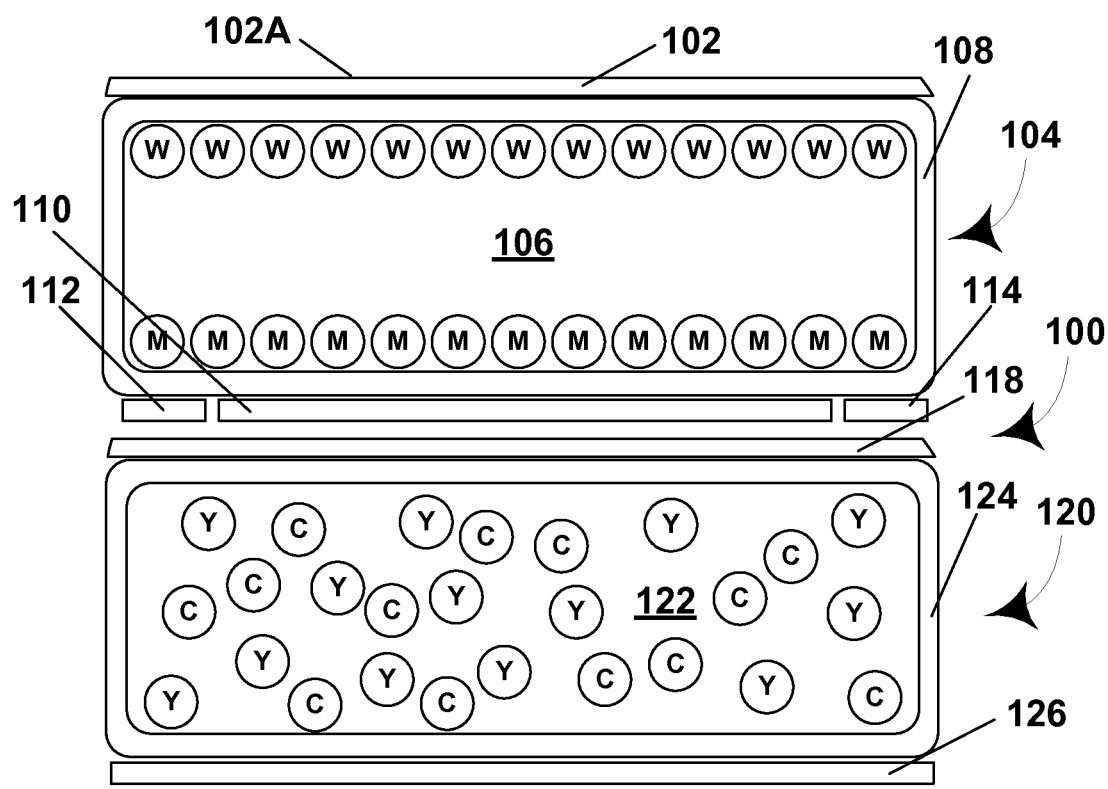
FIG. 1A of the accompanying drawings is a schematic cross-section through one pixel of a first dual layer electrophoretic display of the present invention which uses white, cyan, magenta and yellow particles.

It will be apparent from the foregoing Summary of the Invention that this invention has two primary aspects, namely the dual layer electrophoretic display and the interconnected auxiliary electrodes display. These two aspects will mainly be discussed separately below, but it will be appreciated that both aspects of the invention can be incorporated into a single physical display.

Dual Layer Electrophoretic Display

As already indicated, in one aspect the present invention provides a dual layer electrophoretic display. This display has a viewing surface and separate first and second electrophoretic layers, the first electrophoretic layer lying adjacent the viewing surface and the second electrophoretic layer lying on the opposed side of the first electrophoretic layer from the viewing surface. The first electrophoretic layer comprises a (first) fluid and, dispersed in this fluid, electrically charged white particles and light transmissive electrically charged particles of a first color other than white. The first electrophoretic layer can be driven to three different optical states, namely (a) a first optical state in which the white particles lie adjacent the viewing surface and the first color particles are spaced from the viewing surface, so the viewing surface appears white; (b) a second optical state in which the first color particles lie adjacent the viewing surface and the white particles are spaced from the viewing surface, so the viewing surface displays the first color (unless modified by the action of the second electrophoretic layer, as discussed below); and (c) a third optical state in which the white and first color particles occupy only a minor proportion of the area of the first electrophoretic layer, thereby permitting light entering the first electrophoretic layer through the viewing surface to pass through the first electrophoretic layer to the second electrophoretic layer. The second electrophoretic layer comprises a second fluid (which can be the same as or different from the first fluid) and, dispersed in this second fluid, charged particles of a second color different from white and the first color, and charged particles of a third color different from white and the first and second colors. The second electrophoretic layer can be driven to three different optical states, namely (d) a fourth optical state in which the second particles lie adjacent the first electrophoretic layer and the third color particles are spaced from this layer; (e) a fifth optical state in which the third particles lie adjacent the first electrophoretic layer and the second color particles are spaced from this layer; and (f) a sixth optical state in which the second and third color particles are intermixed within the second fluid.

For purely practical reasons regarding the availability of suitable materials, it is generally preferred that the first color be magenta, the second color by cyan and the third color be yellow, although red, green and blue particles can also be used. The manner in which a dual layer electrophoretic display of the present invention using these color choices displays white, black, magenta, cyan, yellow, red, green and blue will now be explained with reference to FIGS. 1A-1H. For purposes of illustration, it will be assumed that the white and cyan particles bear positive charges and the magenta and yellow particles negative charges although obviously either or both of these charge allocations could be reversed, or one or both of the electrophoretic layers could use two types of particles of the same charge but of differing electrophoretic mobilities.

FIG. 1A shows a single pixel (generally designated 100) of a first dual layer electrophoretic display of the present invention. The pixel 100 comprises a light transmissive front electrode 102, the upper surface 102A of which forms the viewing surface of the display. (In practice, the front electrode 102 would typically comprise a thin layer of indium tin oxide, a carbon nanotube conductor or a conductive polymer disposed on the lower surface (as illustrated) of a transparent polymeric film, but the internal structure of the front electrode 102 is not important for purposes of the present invention.) The pixel 100 further comprises a first electrophoretic layer (generally designated 104) comprising white light positively charged scattering (i.e., reflective) particles W and light transmissive negatively charged magenta particles M in a first fluid 106. The first electrophoretic layer 104 is shown as encapsulated with the particles W and M and the first fluid 106 held within a single capsule bounded by a capsule wall 108; the single capsule is shown only for purposes of illustration and typically more than one capsule would be present in each pixel.

The pixel 100 further comprises, on the opposed side of the capsule from the front electrode 102, a main rear electrode 110 and two auxiliary rear electrodes 112 and 114. The electrodes 110, 112 and 114 are connected to voltage supply lines (not shown) which enable the potentials of the these three electrodes to be controlled independently of one another.

Immediately "behind" the electrodes 110, 112 and 114 (i.e., on the opposed side of these electrodes from the front electrode 102) but insulated therefrom is a further electrode 118, which serves as the front electrode of a second electrophoretic layer (generally designated 120) comprising reflective positively charged cyan particles C and reflective negatively charged yellow particles Y in a second fluid 122. The second electrophoretic layer 120 is shown as encapsulated with the particles C and Y and the first fluid 122 held within a single capsule bounded by a capsule wall 124; again, the single capsule is shown only for purposes of illustration and typically more than one capsule would be present in each pixel. A single further electrode 126, which serves as the rear electrode of the second electrophoretic layer 120 is disposed on the opposed side of the second electrophoretic layer from the electrode 118.

FIG. 1A shows the display in its white state. To drive the display to this state, the front electrode 102 is made negative relative to the rear electrodes 110, 112 and 114 so that the white particles W lie adjacent the front electrode and the magenta particles M adjacent the rear electrodes 110, 112 and 114, so that a white color is displayed at the viewing surface 102A of the display. Since the positions of the cyan particles C and yellow particles W in the second electrophoretic layer 120 are irrelevant (the magenta particles M, the cyan particles C and yellow particles Y all being hidden by the white particles W), the potentials of the electrodes 118 and 126 are irrelevant and these electrodes are conveniently allowed to float.

Figure 1B:
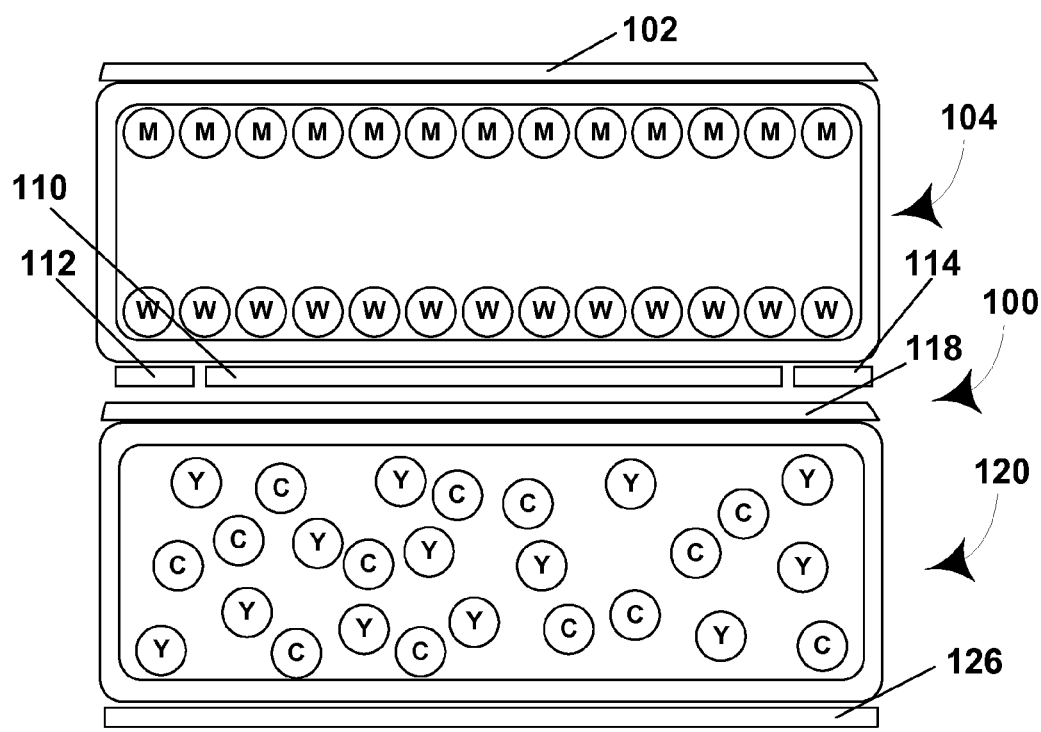
FIGS. 1B-1H are schematic cross-sections similar to that of FIG. 1A but showing the display in its magenta, cyan, yellow, red, blue, green and black optical states respectively.

FIG. 1B shows the display in its magenta state. To drive the display to this state, the front electrode 102 is made positive relative to the rear electrodes 110, 112 and 114 so that the magenta particles M lie adjacent the front electrode 102 and the white particles W adjacent the rear electrodes 110, 112 and 114, so that light entering the display through the viewing surface 102A passes through the transmissive magenta particles M and the first fluid 106, is reflected from the white particles M, and passes back through the first fluid 106 and the transmissive magenta particles M, and thus a magenta color is displayed at the viewing surface 102A of the display. Again, the positions of the cyan particles C and yellow particles W in the second electrophoretic layer 120 are irrelevant (the cyan particles C and yellow particles Y both being hidden by the white particles W), so the potentials of the electrodes 118 and 126 are irrelevant and these electrodes are conveniently allowed to float.

Figure 1C:
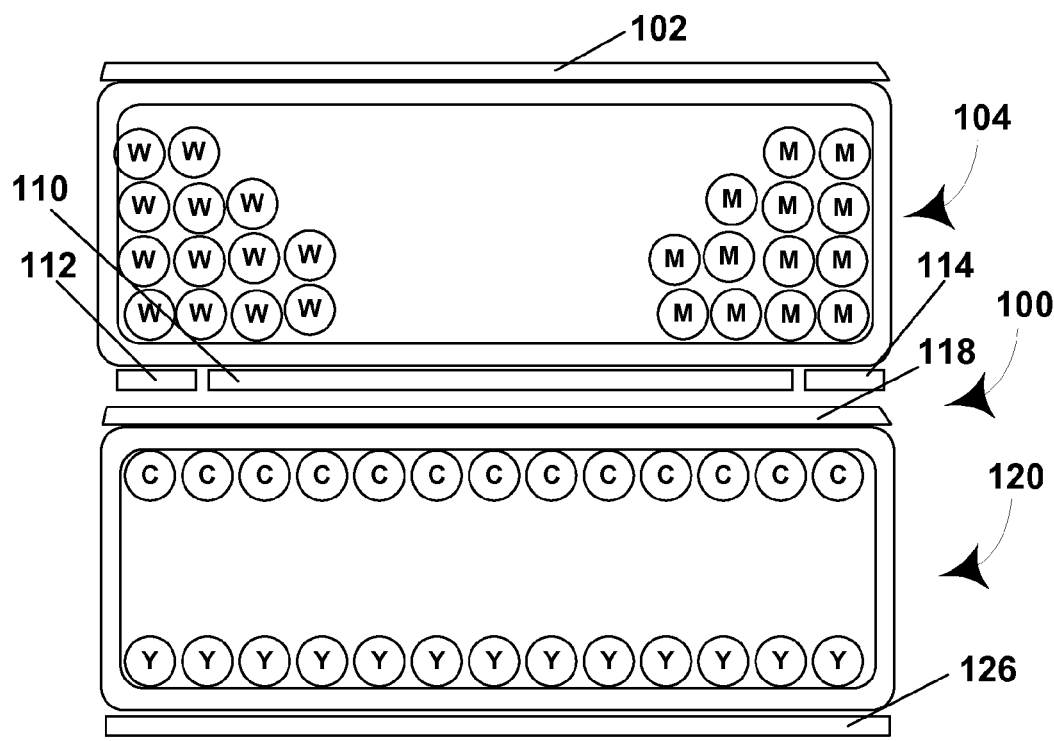

To produce a cyan color, as illustrated in FIG. 1C, one of the auxiliary rear electrodes (for convenience illustrated as electrode 112) is made negative, and the other auxiliary electrode 114 is made positive, relative to both the front electrode 102 and the main rear electrode 110. The white particles W move adjacent the negative auxiliary electrode 112, while the magenta particles move adjacent the positive auxiliary electrode 114, thus effectively "shuttering" both the white and magenta particles and leaving the major portion of the area of the first electrophoretic layer 104 open for light to pass from the viewing surface 102A to the second electrophoretic layer 120. (The fraction of the cross-sectional area of the capsule occupied by the magenta and white particles in FIG. 1C and other similar Figures below is considerably exaggerated for ease of illustration. In practice, more than 80 percent of the capsule can readily be made transparent.) Meanwhile, the front electrode 118 of the second electrophoretic layer 120 is made negative relative to the rear electrode 126 thereof, so that the reflective cyan particles C lie adjacent the front electrode 118 and the yellow particles Y lie adjacent the rear electrode 126. Accordingly, light entering the display 100 through the viewing surface 102A passes through the "open" (transmissive) first electrophoretic layer 104, and is reflected from the cyan particles C adjacent the electrode 118 (these cyan particles C serving to hide the yellow particles Y adjacent the electrode 126), and the pixel 100 displays a cyan color.

Figure 1D:
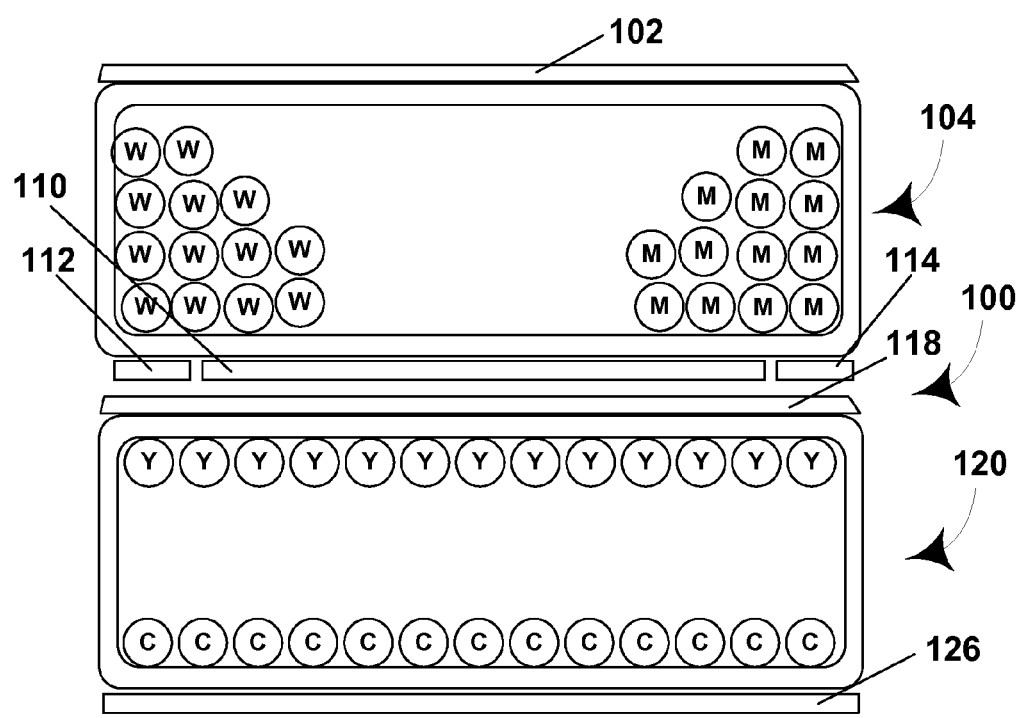

To produce a yellow color, as illustrated in FIG. 1D, the potentials of the electrodes 102, 110, 112 and 114, and hence the positions of the white particles W and the magenta particles M, are the same as in FIG. 1C. However, now the front electrode 118 of the second electrophoretic layer 120 is made positive relative to the rear electrode 126 thereof, so that the reflective yellow particles Y lie adjacent the front electrode 118 and the cyan particles C lie adjacent the rear electrode 126. Accordingly, light entering the display 100 through the viewing surface 102A passes through the open first electrophoretic layer 104, and is reflected from the yellow particles Y adjacent the electrode 118 (these yellow particles Y serving to hide the cyan particles C adjacent the electrode 126), and the pixel 100 displays a yellow color.

Figure 1E:
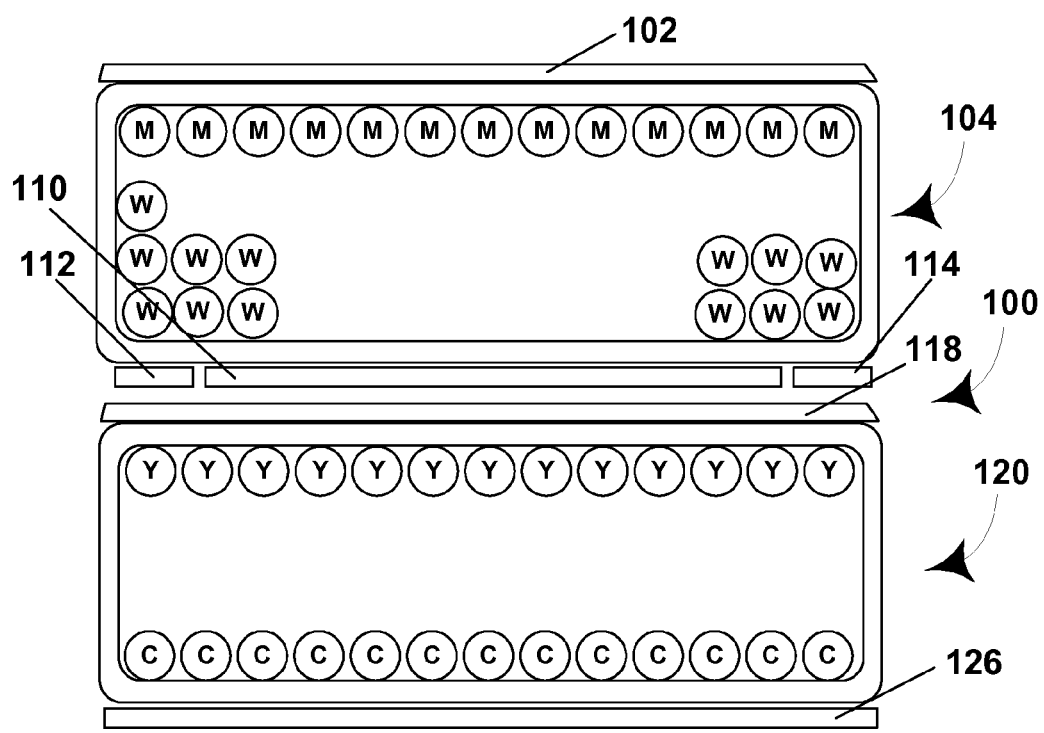

To produce a red color at the pixel 100, it is necessary for light absorption to occur by both the magenta particles M and the yellow particles Y. Accordingly, as shown in FIG. 1E, the front electrode 102 is made positive, and one or both of the auxiliary electrodes 112 and 114 are made negative (both auxiliary electrodes 112 and 114 are shown as negative for ease of illustration) relative to the main rear electrode 110. Accordingly, the light transmissive magenta particles M lie adjacent the front electrode 102, while the white particles W lie adjacent the negative auxiliary electrodes 112 and 114, thus shuttering the white particles W. Meanwhile, as in FIG. 1B, the front electrode 118 of the second electrophoretic layer 120 is made positive relative to the rear electrode 126 thereof, so that the reflective yellow particles Y lie adjacent the front electrode 118 and the cyan particles C lie adjacent the rear electrode 126. Accordingly, light entering the display 100 through the viewing surface 102A passes through the magenta particles M (with absorption of green wavelengths) and is reflected from the yellow particles Y adjacent the electrode 118 (these yellow particles Y serving to hide the cyan particles C adjacent the electrode 126), with absorption of blue wavelengths, and passes back through the magenta particles M, so that the pixel 100 displays a red color.

Figure 1F:
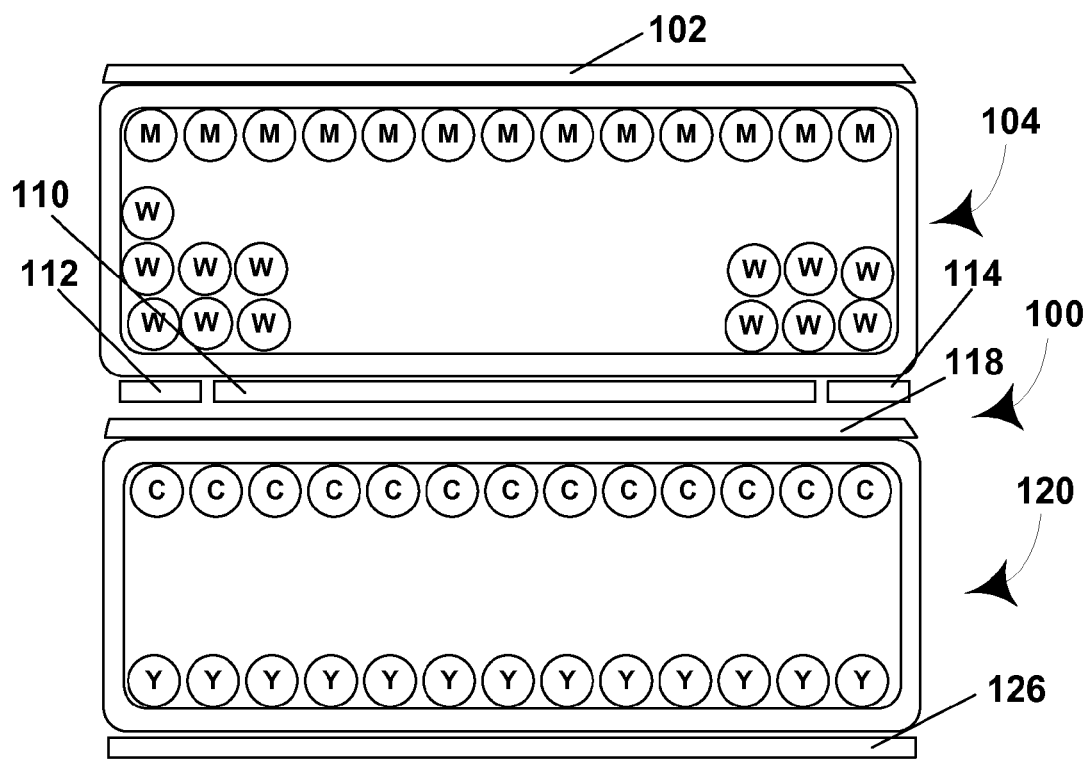

To produce a blue color, as illustrated in FIG. 1F, the relative potentials of the electrodes 102, 110, 112 and 114, and hence the positions of the white particles W and the magenta particles M, are the same as in FIG. 1E. However, now the front electrode 118 of the second electrophoretic layer 120 is made negative relative to the rear electrode 126 thereof, so that the reflective cyan particles C lie adjacent the front electrode 118 and the yellow particles Y lie adjacent the rear electrode 126. Accordingly, light entering the display 100 through the viewing surface 102A passes through the magenta particles M (with absorption of green wavelengths) and is reflected from the cyan particles C adjacent the electrode 118 (these cyan particles C serving to hide the yellow particles Y adjacent the electrode 126), with absorption of red wavelengths, and passes back through the magenta particles M, so that the pixel 100 displays a blue color.

Figure 1G:
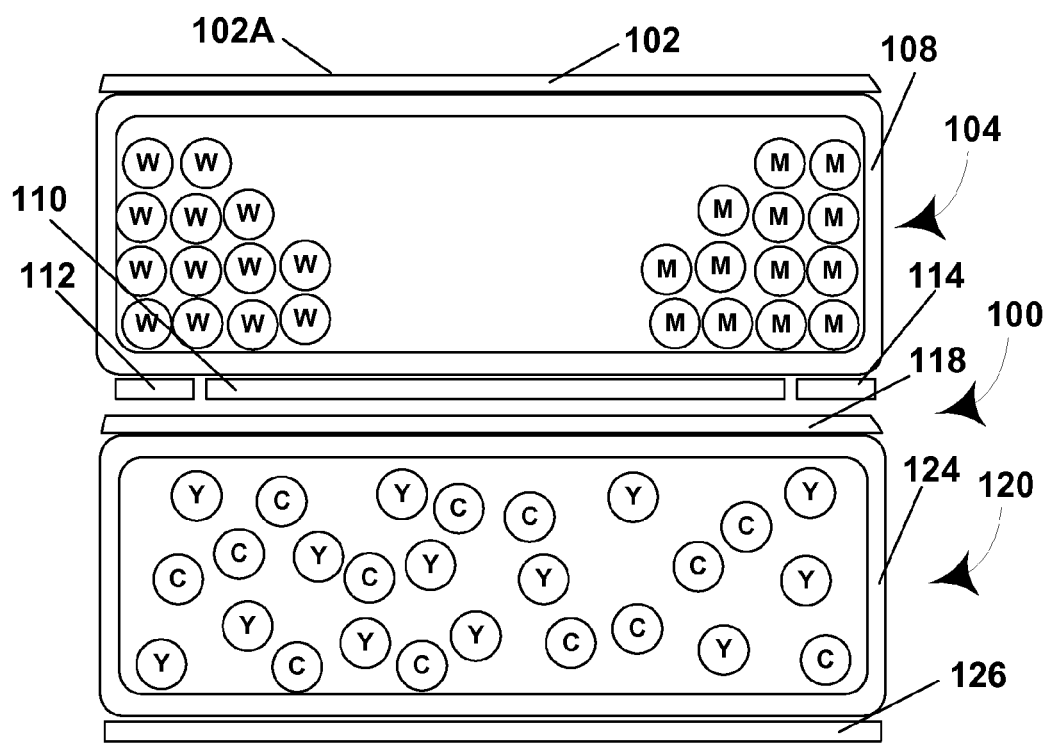

To produce a green color, as illustrated in FIG. 1G, the relative potentials of the electrodes 102, 110, 112 and 114, and hence the positions of the white particles W and the magenta particles M, are the same as in FIGS. 1C and 1D, i.e., both the white particles W and the magenta particles M are shuttered. However, in this case the cyan particles C and the yellow particles Y are intermixed within the second fluid 122; such intermixing can be effected by first moving the cyan particles C and the yellow particles Y to the positions shown in either of FIGS. 1E and 1F, and then reversing the relative potentials of the electrodes, so that the cyan particles C and the yellow particles Y become intermixed within the second fluid 122. Accordingly, light entering the display 100 through the viewing surface 102A passes through the open first electrophoretic layer 104, and is reflected from both the yellow particles Y and the cyan particles C within the fluid 122, and the pixel 100 displays a green color.

Figure 1H:
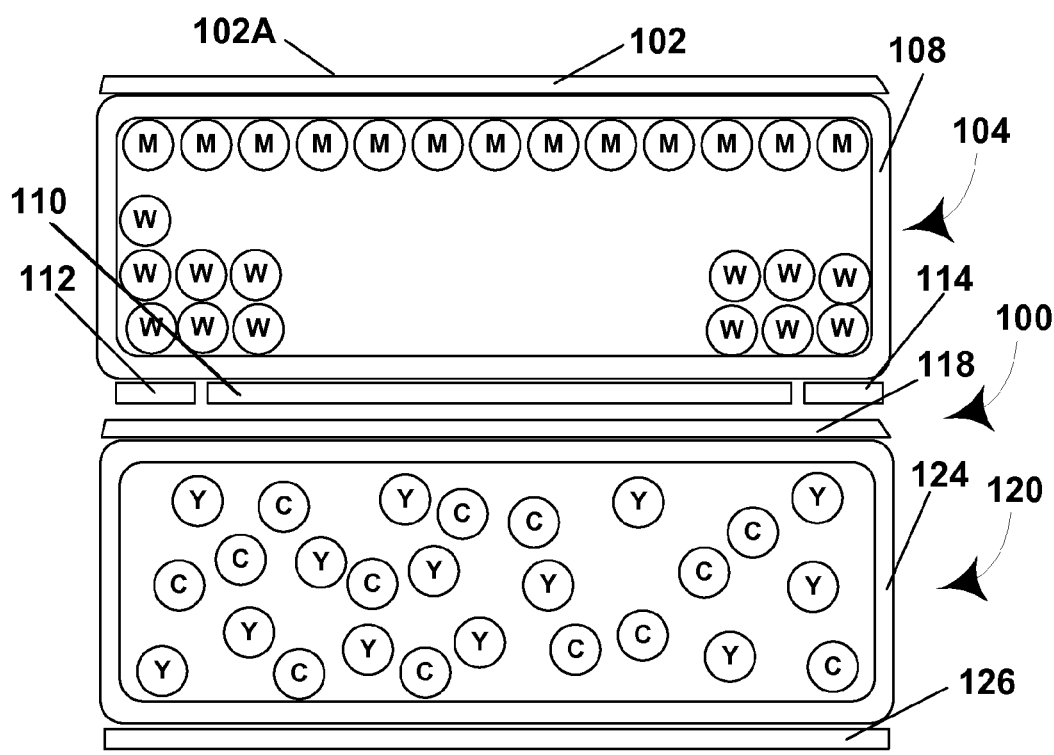

Finally, to produce a black pixel, as illustrated in FIG. 1H, the relative potentials of the electrodes 102, 110, 112 and 114, and hence the positions of the white particles W and the magenta particles M, are the same as in FIG. 1E. Meanwhile, the cyan particles C and the yellow particles Y are intermixed within the second fluid 122, as in FIG. 1G. Accordingly, light entering the display 100 through the viewing surface 102A passes through the magenta particles M (with absorption of green wavelengths) and is reflected from both the yellow particles Y (which absorb blue wavelengths) and the cyan particles C (which absorb red wavelengths) within the fluid 122, so that essentially no light returns through the first electrophoretic layer 104, and the pixel 100 displays a black color.

It will be seen from the foregoing that the display illustrated in FIGS. 1A-1H is capable of displaying white, black, cyan, magenta, yellow, red, green and blue colors over its entire display area. As previously noted, displays using RGB color filter arrays are capable of displaying red, green and blue colors over only one third of their display area, black over the whole display area and a process white equivalent to white over one third of the display area. Similarly, displays using RGBW color filter arrays are capable of displaying red, green and blue colors over only one fourth of their display area, black over the whole display area and a process white equivalent to white over one half of the display area. Accordingly, provided it is well designed, with highly saturated pigments, the dual layer electrophoretic display of the present invention illustrated in FIGS. 1A-1H should yield a larger display gamut and contrast than prior art color filter array based color displays.

It should be noted that in the display 100 it is not necessary that the dimensions of the pixels in the first and second electrophoretic layers 104 and 120 be the same. Indeed, it may be advantageous to use different dimensions in the two layers to avoid moiré patterns and similar optical artifacts.

It will be seen from the description of FIGS. 1C-1H above that the ability of the display 100 to display various colors is dependent upon the ability to shutter one or both of the electrophoretic particles in the front electrophoretic layer 104 by confining one or both of the electrophoretic particles to a small fraction of the active area of the pixel 100. As already mentioned, the necessary shuttering of the first electrophoretic layer can be achieved using auxiliary electrodes or by AC driving; in the case of displays which use microcells rather than capsules, the auxiliary electrodes could be positioned in the side walls of the microcells. Whichever method is employed to shutter the particles in the first electrophoretic layer, the method should confine the particles to as small a fraction as possible of the area of the pixel, thus providing as large a fraction as possible of transparent area through which light can reach the second electrophoretic layer. The efficiency of the particle shuttering and the particle loading in the first electrophoretic layer will determine the optical transmissivity of this layer in its shuttered states, which will necessarily to less than 100 percent. The inevitable absorption of light in the first electrophoretic layer will result in a reduction in color saturation of the colors displayed by the second electrophoretic layer. Since the reflectivity of the white state of the display is one crucial criterion of a display so far as most users are concerned, it is advantageous to keep the white particles in the first electrophoretic layer, since the reflectivity of white particles in the second electrophoretic layer would inevitably be reduced by light losses due to incomplete shuttering of the first electrophoretic layer and by absorption by the electrodes and thin film transistors disposed between the first and second electrophoretic layers. For similar reasons, the particles in the second electrophoretic layer should have highly saturated colors to minimize the reduction in color saturation caused by the light losses due to incomplete shuttering of the first electrophoretic layer and by absorption by the electrodes and thin film transistors disposed between the first and second electrophoretic layers. Cyan and yellow pigments having excellent color saturation are widely available and hence are preferred for use in the second electrophoretic layer of the dual layer display of the present invention.

One potential problem with the first embodiment of the invention shown in FIGS. 1A-1H is that when the electrodes 112 and 114 are held at different potentials for the purpose of shuttering the magenta and white particles, a substantial dipole will be induced in the electrode 110, thus causing the magenta and white particles to occupy parts of the electrode 110 and hence increasing the fraction of the area of the pixel blocked by the magenta and white particles. If in any particular display this problem is found to be severe, there are two main ways of reducing the problem. The first is to rely upon AC driving to effect simultaneous shuttering of both the magenta and white particles, as already discussed. (Note that it makes no difference to the operation of the display that such AC driving will cause the white and magenta particles to be mixed with each other when both are shuttered. In the display states shown in FIGS. 1C, 1D, 1G and 1H, it makes no difference to the appearance of the display whether the white and magenta particles are admixed or shuttered at separate locations. In the display states shown in FIGS. 1E and 1H, where only the white particles are shuttered, such shuttering will of course normally be effected by means of auxiliary electrodes, though since in both cases the electrodes 112 and 114 are at the same potential, there is no dipole within the electrode 110, so the aforementioned problem does not arise.) The second approach is to eliminate the electrode 110, thus avoiding any possibility of inducing a dipole in this electrode. The only display state which is significantly affected by eliminating the electrode 110 is that shown in FIG. 1B (the position of the magenta particles is changed in the state shown in FIG. 1A, but this is irrelevant since the magenta particles are masked by the white particles and hence are not visible to an observer of the display). In the display state shown in FIG. 1B, eliminating the electrode 110 concentrates the white particles adjacent the electrodes 112 and 114, so that the white particles are not available over the whole are of the pixel 100 to reflect back the magenta light passing through the layer of magenta particles. Accordingly, if the electrode 110 is to be eliminated, it is advisable to provide a white reflector adjacent or as part of the rearmost electrode 126 to act as a reflector in the display state shown in FIG. 1B, and to shutter the cyan and yellow particles to allow light passing through the magenta particles to be reflected from this reflector.

FIGS. 2A-2E are schematic cross-sections, similar to those of FIGS. 1A-1H, through one pixel (generally designated 300) of a second electrophoretic display of the present invention, This second electrophoretic display uses white, red, green and blue particles in place of the white, magenta, cyan and yellow particles used in the first display described above, and all the particles are reflective. Also, in the second display, the main rear electrode (110 in FIG. 1A) of the first electrophoretic layer is omitted.

More specifically, the pixel 300 comprises a light transmissive front electrode 302, the upper surface 302A of which forms the viewing surface of the display. The pixel 300 further comprises a first electrophoretic layer (generally designated 304) comprising white light positively charged particles W and negatively charged red particles R in a first fluid 306. The first electrophoretic layer 304 is encapsulated with the particles W and R and the first fluid 306 held within a single capsule bounded by a capsule wall 308; the single capsule is shown only for purposes of illustration and typically more than one capsule would be present in each pixel.

The pixel 300 further comprises, on the opposed side of the capsule from the front electrode 302, two auxiliary rear electrodes 312 and 314. The electrodes 312 and 314 are connected to voltage supply lines (not shown) which enable the potentials of the these electrodes to be controlled independently of one another.

Immediately "behind" the electrodes 112 and 114 (i.e., on the opposed side of these electrodes from the front electrode 302) but insulated therefrom is a further electrode 318, which serves as the front electrode of a second electrophoretic layer (generally designated 320) comprising positively charged blue particles B and negatively charged green particles G in a second fluid 322. The second electrophoretic layer 320 is encapsulated with the particles B and G and the first fluid 322 held within a single capsule bounded by a capsule wall 324; again, the single capsule is shown only for purposes of illustration and typically more than one capsule would be present in each pixel. A single further electrode 326, which serves as the rear electrode of the second electrophoretic layer 320 is disposed on the opposed side of the second electrophoretic layer from the electrode 318.

Figure 2A:
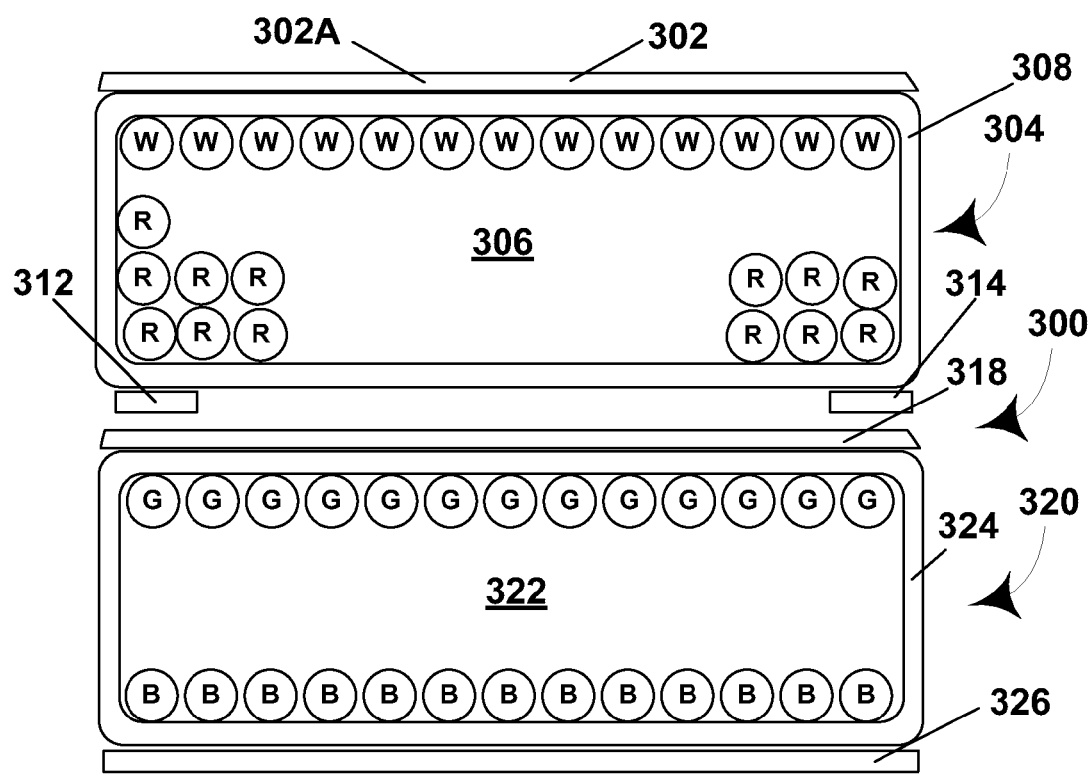
FIGS. 2A-2E are schematic cross-sections, similar to those of FIGS. 1A-1H, through one pixel of a second dual layer electrophoretic display of the present invention which uses white, red, green and blue particles.

FIG. 2A shows the pixel 300 in its white state. To drive the pixel to this state, the front electrode 302 is made negative relative to the rear electrodes 312 and 314 so that the white particles W lie adjacent the front electrode 302 and the red particles R lie adjacent the rear electrodes 312 and 314, so that a white color is displayed at the viewing surface 302A of the pixel. The positions of the blue B and green G particles in the second electrophoretic layer 320 are irrelevant (the red particles R, the blue particles B and the green particles G all being hidden by the white particles W), and for ease of illustration the green particles G are shown adjacent the electrode 318 and the blue particles B adjacent the electrode 326.

Figure 2B:
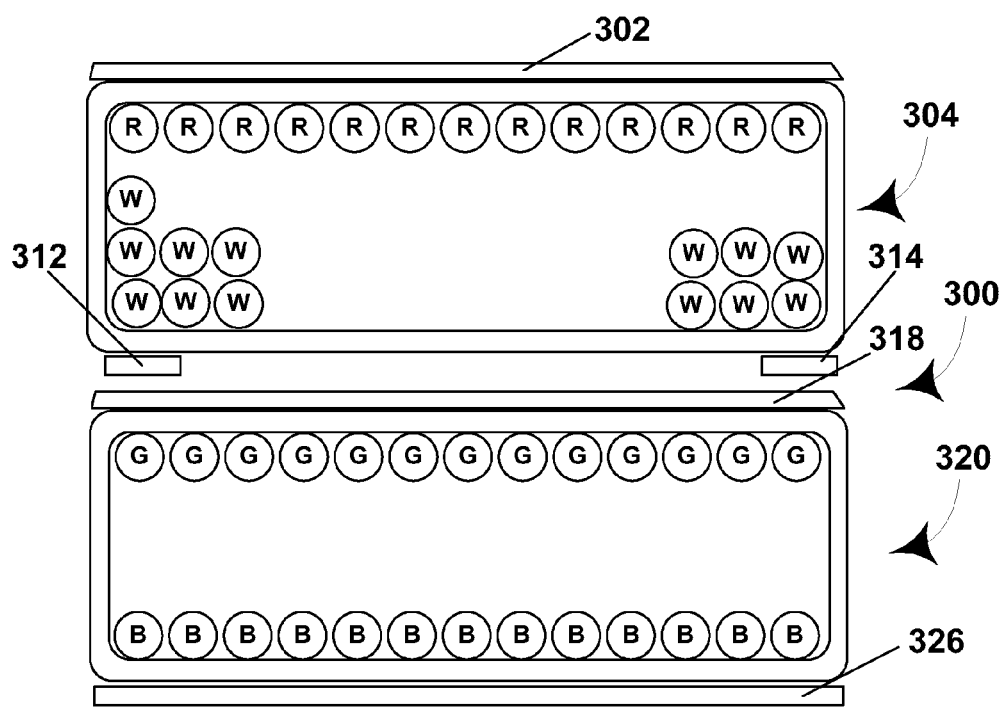

FIG. 2B shows the pixel 300 in its red optical state. To drive the pixel to this state, the front electrode 302 is made positive relative to the rear electrodes 312 and 314 so that the red particles R lie adjacent the front electrode 302 and the white particles W lie adjacent the rear electrodes 312 and 314, so that a red color is displayed at the viewing surface 302A of the pixel. Note that since the red particles R are reflective rather than transmissive, the positions of the blue B and green G particles in the second electrophoretic layer 320 are irrelevant (the white particles W, the blue particles B and the green particles G all being hidden by the red particles R), and again for ease of illustration the green particles G are shown adjacent the electrode 318 and the blue particles B adjacent the electrode 326.

Figure 2C:
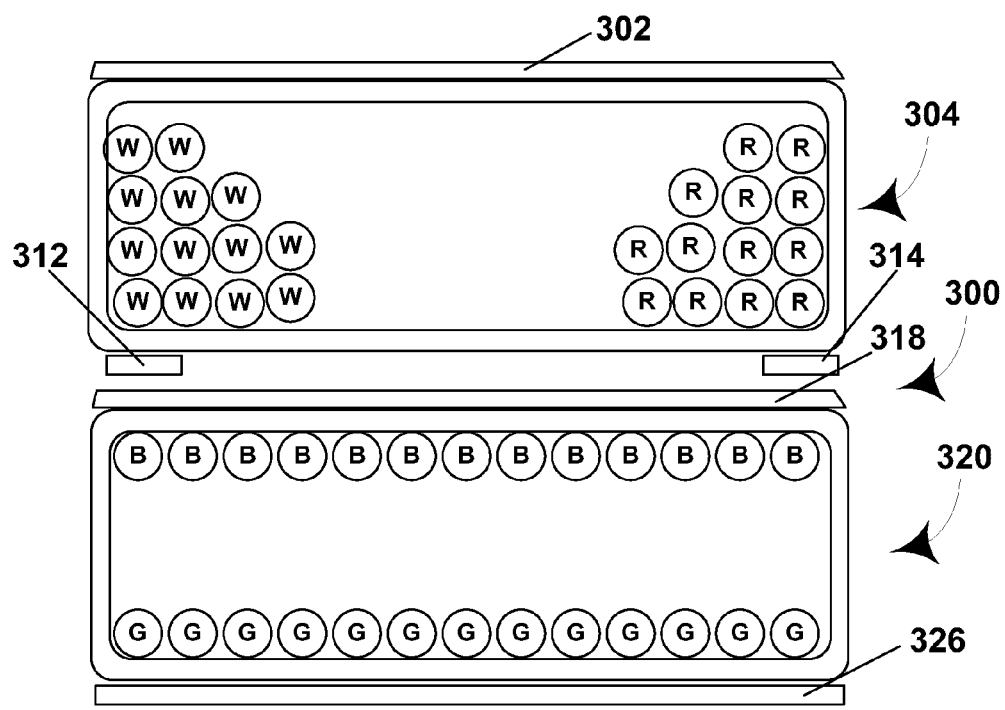
Figure 2D:
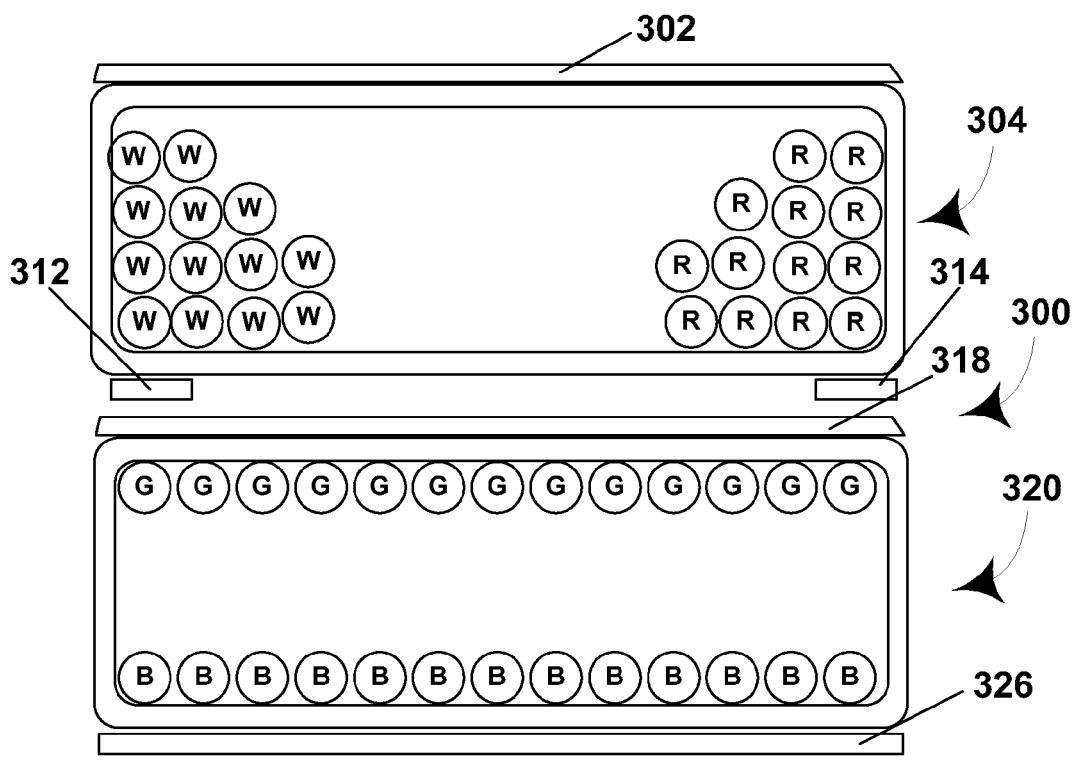
Figure 2E:
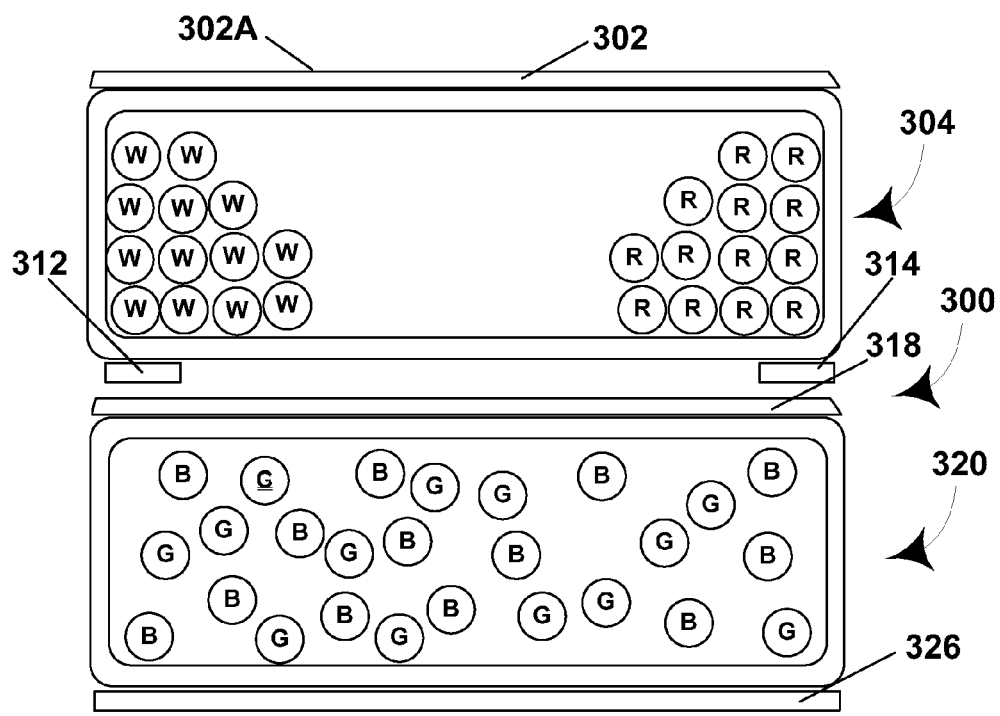

FIG. 2C shows the pixel 300 is its blue optical state. As in the cyan optical state shown in FIG. 1C, one of the rear electrodes (for convenience illustrated as electrode 312) is made negative, and the other electrode 314 is made positive, relative to the front electrode 302. The white particles W move adjacent the negative electrode 312, while the red particles R move adjacent the positive electrode 314, thus effectively "shuttering" both the white and red particles and leaving the major portion of the area of the first electrophoretic layer 304 open for light to pass from the viewing surface 302A to the second electrophoretic layer 320. (As in FIG. 1C, the fraction of the cross-sectional area of the pixel occupied by the red and white particles in FIGS. 2C-2E is considerably exaggerated for ease of illustration. In practice, more than 80 percent of the pixel can readily be made transparent.) Meanwhile, the front electrode 318 of the second electrophoretic layer 320 is made negative relative to the rear electrode 326 thereof, so that the blue particles B lie adjacent the front electrode 318 and the green particles G lie adjacent the rear electrode 326. Accordingly, light entering the pixel 300 through the viewing surface 302A passes through the "open" (transmissive) first electrophoretic layer 304, and is reflected from the blue particles B adjacent the electrode 318 (these blue particles B serving to hide the green particles G adjacent the electrode 326), and the pixel 300 displays a blue color.

To produce a green color, as illustrated in FIG. 2D, the potentials of the electrodes 302, 312 and 314, and hence the positions of the white particles W and the red particles R, are the same as in FIG. 2C. However, now the front electrode 318 of the second electrophoretic layer 320 is made positive relative to the rear electrode 326 thereof, so that the green particles G lie adjacent the front electrode 318 and the blue particles B lie adjacent the rear electrode 326. Accordingly, light entering the pixel 300 through the viewing surface 302A passes through the open first electrophoretic layer 304, and is reflected from the green particles G adjacent the electrode 118 (these green particles G serving to hide the blue particles B adjacent the electrode 326), and the pixel 300 displays a green color.

Finally, to produce a black pixel, as illustrated in FIG. 2E, the relative potentials of the electrodes 302, 312 and 314, and hence the positions of the white particles W and the red particles R, are the same as in FIGS. 2C and 2D. Meanwhile, the blue particles B and the green particles G are intermixed within the second fluid 322. Accordingly, light entering the pixel 300 through the viewing surface 302A passes through the first electrophoretic layer 304 and is reflected from both the blue particles B (which absorb red and green wavelengths) and the green particles G (which absorb red and blue wavelengths) within the fluid 322, so that essentially no light returns through the first electrophoretic layer 304, and the pixel 300 displays a black color.

It will be observed that the display shown in FIGS. 2A-2E, which uses red, green and blue particles, is not capable of displaying yellow, cyan and magenta at a single pixel, and to produce yellow, cyan and magenta colors it is necessary to resort to a form of areal modulation. For example, to produce a yellow color, it is necessary to display a red pixel adjacent a green one. Similarly, to display a cyan color, a green pixel is displayed adjacent a blue one, while to display a magenta color a red pixel is displayed adjacent a blue one. However, the color produced will still be superior to that produced by a prior art display using color filters, since (for example) in effect a yellow color can still be displayed over the full area of the display, in contrast to a color filter based RGBW display.

It will be seen from the foregoing that the dual layer display of the present invention is capable of displaying a wide range of colors at every pixel, with an excellent white state, and without requiring electrophoretic layers with more than two types of particles in each layer. Hence, the dual layer display is capable of a larger color gamut than area-sharing color electrophoretic displays based upon color filter arrays over monochrome electrophoretic layers.

Interconnected Auxiliary Electrodes Display

In displays such as that illustrated in FIGS. 1A-1H and 2A-2E above, in which each pixel requires one or more auxiliary electrodes, the potentials of which must be variable independently of the potential of a main electrode of the same pixel, establishing the necessary connections to the auxiliary electrodes poses substantial problems, especially in high resolution active matrix displays. Hitherto, in active matrix displays, the auxiliary electrodes have normally been driven in a manner exactly parallel to the main electrodes; each column of auxiliary electrodes are connected to a data line parallel to the data line used to drive the column of associated main electrodes, and, as each row of the active matrix display is scanned by the row driver of the active matrix display, potentials are applied to the auxiliary electrodes of the pixels in the selected row at the same time that potentials are applied to the main electrodes of the same pixels. Such an arrangement at least doubles the number of data lines needed, and in the case of displays such as that shown in FIGS. 1A-1H and 2A-2E, which require two auxiliary electrodes per pixel, triples the number of data lines needed. This increase in the number of data lines substantially increases the complexity and expense of the backplane, and, in high resolution displays, requires the use of very narrow data lines, which is likely to result in increased failure rates of the data lines and hence reduced yield of backplanes. Furthermore, the increase in the number of data lines doubles or triples the amount of data which must be transmitted for each display update, thus further increasing the complexity and cost of the display.

It has now been realized that the construction of backplanes for displays with auxiliary electrodes can be greatly simplified by interconnecting the auxiliary electrodes of a plurality of columns of pixels (and preferably of all the pixels of the display). Displays with the interconnected auxiliary electrodes can be driven to display any desired image using a two-step driving method in which all pixels are first driven to their shuttered state and then the pixels which are not required to be in a shuttered state are driven to their final states using the main and front electrodes.

Figure 3A:
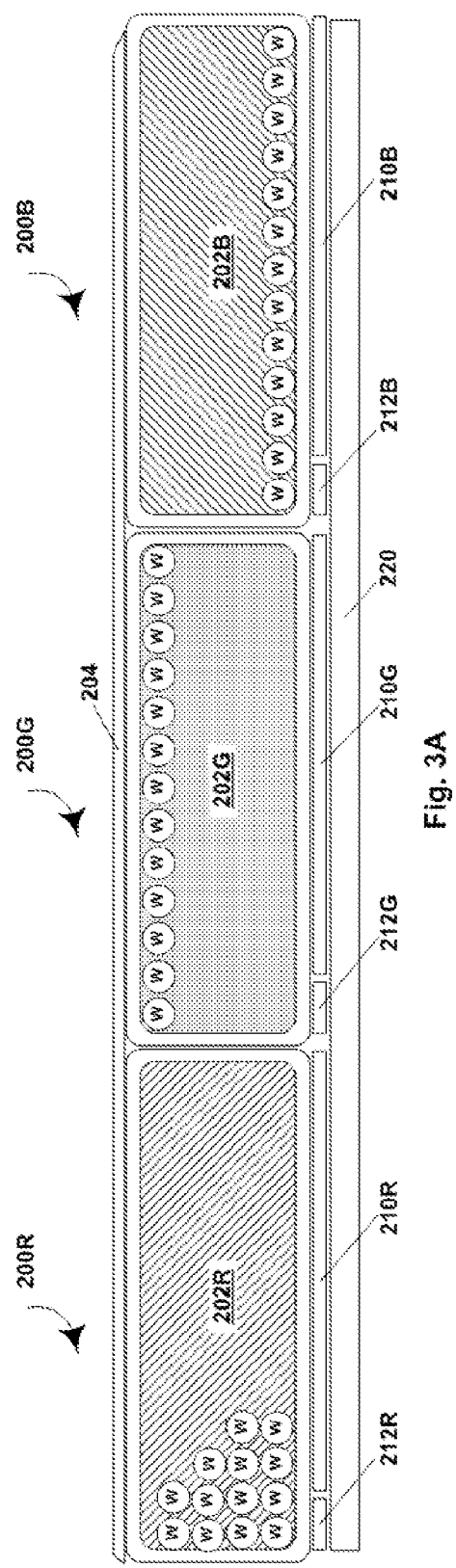
FIG. 3A is a schematic section through three sub-pixels of a single interconnected auxiliary electrode display of the present invention.

FIG. 3A of the accompanying drawings is a schematic section through three sub-pixels (designated 200R, 200G and 200B respectively) of an interconnected auxiliary electrodes display of the present invention produced by modifying a known type of color encapsulated electrophoretic display. Each of the sub-pixels comprises white charged particles W (assumed to be positively charged for purposes of illustration) in a colored fluid 202R, 202G and 202B, these fluids being colored red, green and blue respectively. The display has a light transmissive continuous common front electrode 204, which forms the viewing surface of the display, and each of the sub-pixels has a main rear electrode 210R, 210G or 210B and a single auxiliary rear electrode 212R, 212G or 212B. The main and auxiliary rear electrodes are light transmissive and are disposed on a black rear substrate 220; alternatively, the main and auxiliary rear electrodes could themselves be colored black.

As illustrated in FIG. 3A, each sub-pixel has three different optical states. In the first optical state, illustrated for sub-pixel 200G, the main rear electrode 210G is made positive relative to the front electrode 204, so that the white particles W lie adjacent the front electrode 204, and the sub-pixel present a white appearance. In the second optical state, illustrated for sub-pixel 200B, the main rear electrode 210B is made negative relative to the front electrode 204, so that the white particles W lie adjacent the main rear electrode 210B. Light entering the sub-pixel 200B through the front electrode 204 passes through blue fluid 202B, is reflected from the white particles W and passes back through the blue fluid 202B. Hence, the sub-pixel presents the color of the fluid, in this case blue. In the third optical state, illustrated for sub-pixel 200R, the rear auxiliary electrode 212R is made negative relative to both the main rear electrode 210R and the front electrode 204, so that the white particles W are attracted to the auxiliary electrode 212R and thus shuttered. Light entering the sub-pixel 200R through the front electrode 204 passes through red fluid 202R and is absorbed by the black substrate 220 so that the sub-pixel presents a black appearance.

Figure 3B:
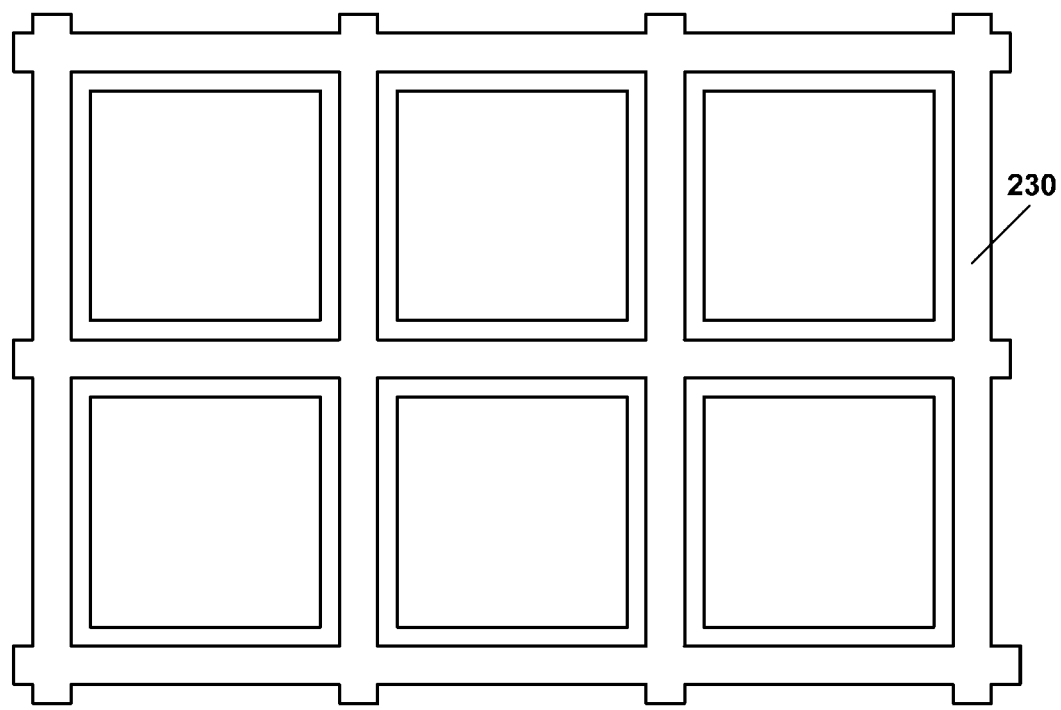
FIG. 3B is a schematic top plan view of modified form of the single interconnected auxiliary electrode display shown in FIG. 3A.

In prior art displays, as already mentioned, the main and auxiliary rear electrodes are driven by parallel data lines, with consequent increase in the cost and complexity of the backplane. FIG. 3B is a top plan view shows how the backplane of the display shown in FIG. 3A can be modified in accordance with the present invention to permit a simplified backplane. As shown in FIG. 3B, the rear auxiliary electrodes of all pixels are replaced by a continuous grid 230 extending around all the main rear electrodes; this continuous grid need only be connected to a voltage supply line at a single point. To drive the display, one first sets the grid 230 to a voltage lower than that of both the main rear electrodes and the front electrode, so that all the white particles W are attracted to the grid 230 and all sub-pixels present a black appearance, as described above for sub-pixel 200R in FIG. 3A. Thereafter, the grid 230 is set to the same voltage as the front electrode 204 and the voltages of the main rear electrodes of the various sub-pixels are adjusted to drive those sub-pixels which are not to display a black appearance in the final image to the desired color states. For example, to display a green area of the image, the red and blue sub-pixels would be left in their black states, while the green sub-pixels would be switched to their green states.

Figure 4:
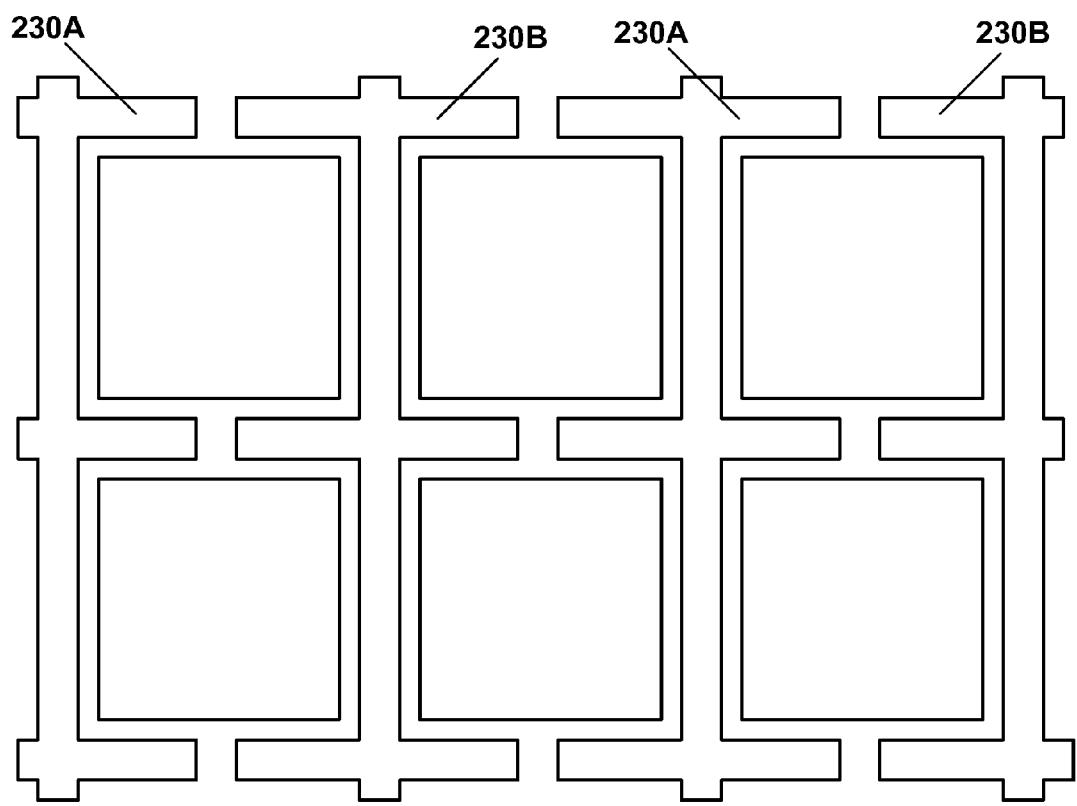
FIG. 4 is a schematic top plan view, similar to that of FIG. 3B, of a double interconnected auxiliary electrode display of the present invention.

FIG. 4 of the accompanying drawings is a top plan view, similar to that of FIG. 3B but illustrating a form of interconnected auxiliary electrodes appropriate for use with an electrophoretic medium (for example, the front electrophoretic layer shown in FIGS. 1A-1H or that shown in FIGS. 2A-2E), which uses two types of electrophoretic particles having charges of opposite polarity. The grid 230A, 230B shown in FIG. 4 may be regarded as derived from the grid 230 by dividing the grid 230 along the mid-lines of each column of sub-pixels, thus producing two separate sub-grids 230A, 230B, which are connected to separate voltage supply lines (not shown) so that the potentials of the two sub-grids can be controlled independently. The backplane shown in FIG. 4 is driven in a manner very similar to that shown in FIG. 3B; the two sub-grids 230A, 230B are first made positive and negative respectively relative to the front and main rear electrodes, thus attracting both types of electrophoretic particles to the two sub-grids. Thereafter, the sub-pixels which need to be in other optical states are driven to those states in the conventional manner.

By using only one or two voltage supply lines to shutter the entire display, the backplane and drive electronics can be made at much lower cost, especially if the waveform used for shuttering requires high frequency or voltage. Implementing one or two high current drivers for the entire display is feasible, whereas implementing a large number of such drivers, one for each pixel would be cost-prohibitive and prone to failure.

As already mentioned, the interconnected auxiliary electrodes structures of the present invention are of significant benefit when used to control the first electrophoretic layer of a dual layer electrophoretic display of the present invention. If the rear electrode structure of the first electrophoretic layer contains two continuous sub-grids instead of individual auxiliary rear electrodes, thousands of data lines can be eliminated, the exact number depending upon display resolution and area, thus substantially reducing the cost of the display. In addition, driving of the display is simplified, as already described.

In summary, the interconnected auxiliary electrode display of the present invention provides a means to shutter a display without adding a great deal of complexity or cost to the display backplane or controller. Only one or two drivers are required for the shuttering grid. Such drivers may be expensive relative to the pixel electrode drivers, but using only one or two of the higher cost drivers enables the overall display cost to be reduced significantly. Such drivers could even be designed to produce higher voltages and frequencies required for dielectrophoretic shuttering, which is very difficult to achieve with individual auxiliary electrodes at each pixel or sub-pixel.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An electrophoretic display having a viewing surface and comprising a first electrophoretic layer adjacent the viewing surface and a second electrophoretic layer on the opposed side of the first electrophoretic layer from the viewing surface, the first electrophoretic layer comprising a first fluid, a plurality of charged white particles and a plurality of light transmissive charged particles of a first color different from white, the white and first color particles being dispersed in the first fluid, the first electrophoretic layer being provided with driving means capable of driving the white and first color particles to three different optical states, namely (a) a first optical state in which the white particles lie adjacent the viewing surface and the first color particles are spaced from the viewing surface; (b) a second optical state in which the first color particles lie adjacent the viewing surface and the white particles are spaced from the viewing surface; and (c) a third optical state in which the white and first color particles occupy only a minor proportion of the area of the first electrophoretic layer, thereby permitting light entering the first electrophoretic layer through the viewing surface to pass through the first electrophoretic layer to the second electrophoretic layer; and the second electrophoretic layer comprising a second fluid, a plurality of charged particles of a second color different from white and the first color, and a plurality of charged particles of a third color different from white and the first and second colors, the second and third color particles being dispersed in the second fluid, the second electrophoretic layer being provided with driving means capable of driving the second and third color particles to three different optical states, namely (d) a fourth optical state in which the second particles lie adjacent the first electrophoretic layer and the third color particles are spaced from this layer; (e) a fifth optical state in which the third particles lie adjacent the first electrophoretic layer and the second color particles are spaced from this layer; and (f) a sixth optical state in which the second and third color particles are intermixed within the second fluid.

2. An electrophoretic display according to claim 1 wherein the second and third color particles are reflective.

3. An electrophoretic display according to claim 1 wherein the first, second and third colors are yellow, cyan and magenta, in any order.

4. An electrophoretic display according to claim 3 wherein the first color is magenta and the second and third colors are yellow and cyan.

5. An electrophoretic display according to claim 1 wherein the first, second and third colors are red, green and blue, in any order.

6. An electrophoretic display according to claim 1 wherein, in the first and second electrophoretic layers, the particles and the fluid confined within a plurality of capsules or microcells, or are present as a plurality of discrete droplets surrounded by a continuous phase of polymeric material.

7. An electrophoretic display according to claim 1 wherein the first electrophoretic layer is provided with electrodes and drivers capable of applying an alternating electric field to the first electrophoretic layer.

8. An electrophoretic display according to claim 1 wherein at least one pixel of the first electrophoretic layer is provided with at least one electrode occupying only a minor fraction of the area of the pixel.

9. An electrophoretic display according to claim 8 wherein said at least one pixel of the first electrophoretic layer is provided with two electrodes each occupying only a minor fraction of the area of the pixel, the potentials of these two electrodes being independently controllable.

10. An electrophoretic display comprising an electrophoretic layer comprising a fluid and a plurality of charged particles dispersed in the fluid, the display having a plurality of pixels each comprising at least one sub-pixel, each sub-pixel having a main and at least one auxiliary electrode on one side of the electrophoretic layer and a third electrode on the opposed side of the electrophoretic layer, the auxiliary electrodes of a plurality of sub-pixels being connected to a common drive line.

11. An electrophoretic display according to claim 10 wherein the auxiliary electrodes of all the sub-pixels of the display are connected to a common drive line.

12. An electrophoretic display according to claim 10 wherein all the charged particles bear charges of the same polarity, and each sub-pixel comprises only one auxiliary electrode.

13. An electrophoretic display according to claim 12 wherein all the auxiliary electrodes of the display are connected to a single drive line.

14. An electrophoretic display according to claim 10 wherein the electrophoretic layer comprises two different types of charged particles bearing charges of opposite polarities, and each sub-pixel comprises two auxiliary electrodes, the two auxiliary electrodes of each sub-pixel being connected to separate drive lines.

15. An electrophoretic display according to claim 10 wherein the electrically charged particles and the fluid are confined within a plurality of capsules or microcells.

16. An electro-optic display according to claim 10 wherein the electrically charged particles and the fluid are present as a plurality of discrete droplets surrounded by a continuous phase comprising a polymeric material.

17. An electro-optic display according to claim 10 wherein the fluid is gaseous.

* * * * *